United States Patent [19]
Le et al.

[11] Patent Number: 6,038,097
[45] Date of Patent: Mar. 14, 2000

[54] METHOD AND APPARATUS FOR PROVIDING POSITIONAL INFORMATION ON A DISK

[75] Inventors: Me Van Le, Milpitas; William E. Wevers, San Jose, both of Calif.

[73] Assignee: Samsung Electronics Co., Ltd., Rep. of Korea

[21] Appl. No.: 08/807,232

[22] Filed: Feb. 28, 1997

[51] Int. Cl.⁷ .................................................. G11B 5/596
[52] U.S. Cl. ..................................... 360/78.14; 360/77.08
[58] Field of Search ............................. 360/77.08, 77.06, 360/77.07, 78.04, 78.14, 97.01, 77.02, 131, 135, 72.1

[56] References Cited

U.S. PATENT DOCUMENTS

| | | |
|---|---|---|
| 4,823,212 | 4/1989 | Knowles et al. . |
| 5,523,902 | 6/1996 | Pederson ............................. 360/77.08 |
| 5,600,506 | 2/1997 | Baum et al. ..................... 360/77.08 X |
| 5,631,783 | 5/1997 | Park . |
| 5,666,238 | 9/1997 | Igari et al. . |

FOREIGN PATENT DOCUMENTS

| | | |
|---|---|---|
| 0 718 827 A2 | 6/1996 | European Pat. Off. . |
| 2 285 165 | 6/1995 | United Kingdom . |
| 2 307 089 | 5/1997 | United Kingdom . |
| 2 308 488 | 6/1997 | United Kingdom . |
| WO 95/24035 | 9/1995 | WIPO . |
| WO 96/23305 | 8/1996 | WIPO . |

*Primary Examiner*—Paul W. Huber
*Attorney, Agent, or Firm*—Blakely, Sokoloff, Taylor & Zafman LLP

[57] ABSTRACT

The present invention is a method and apparatus for providing positional information of a disk. The disk has at least one side with a plurality of tracks, each having a first burst in a first servo field and a second burst in a second servo field. The first burst provides a first portion of track position information while the second burst provides a second portion of track position information. When combined, the first and second portions provide a position of a corresponding track. Each track further includes a third and a fourth burst that provides a first portion and a second portion of disk side position information. When combined, the first and second portions of disk side position information provide the disk side position of the disk. Each track also includes a burst that provides the quadrant position of the disk. In one embodiment, the first and second bursts are located on consecutive sectors, and each track includes a servo sector sequence burst with a sector sequence number that identifies the sequence position of the consecutive sectors. The first portion, the second portion and their corresponding sector sequence number in combination provide a position of a corresponding track.

20 Claims, 5 Drawing Sheets

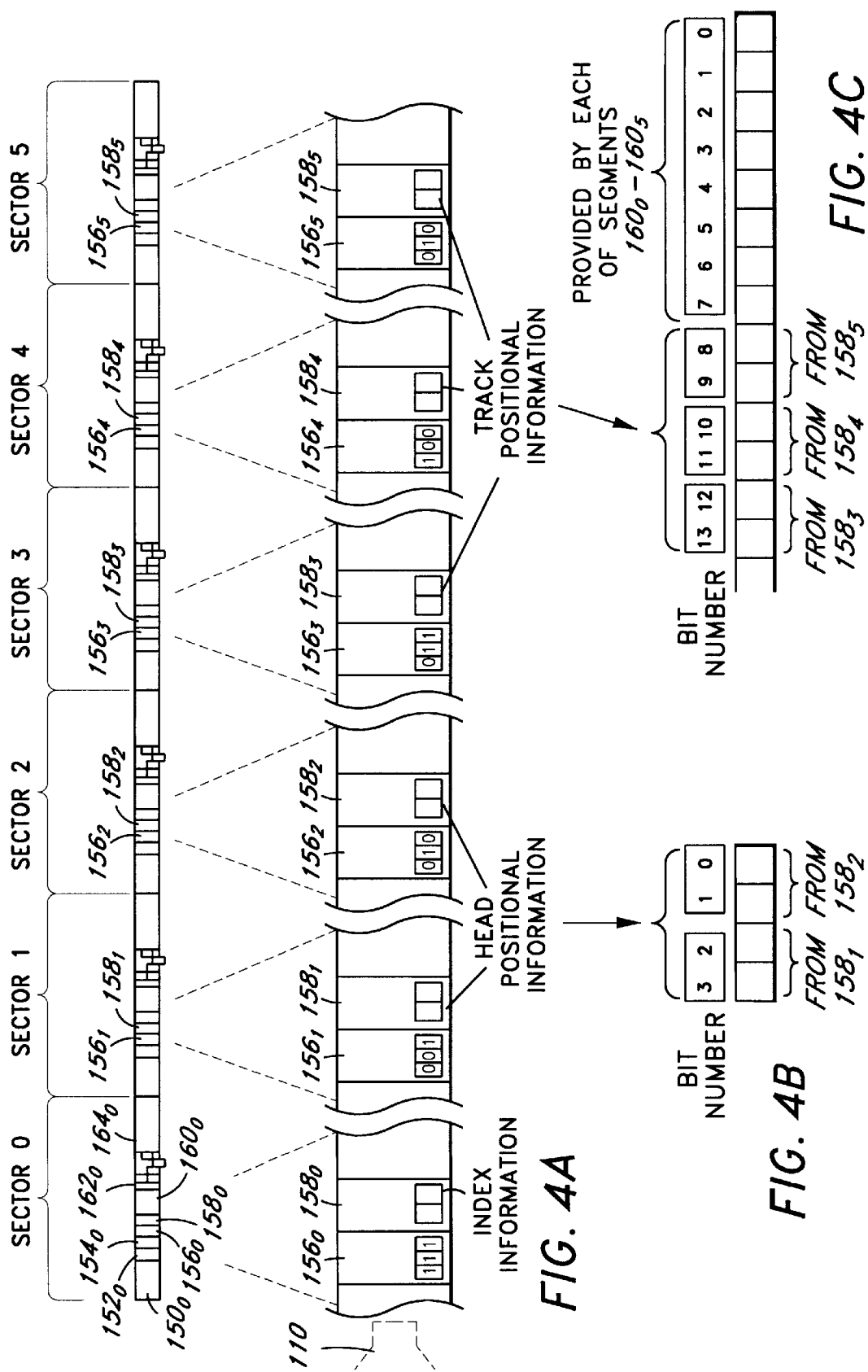

METHOD AND APPARATUS FOR PROVIDING POSITIONAL INFORMATION ON A DISK

BACKGROUND OF THE INVENTION

1. Field of the Invention

The present invention relates in general to disk storage systems and more particularly, to a method and apparatus for providing positional information on a disk in a hard drive assembly.

2. Description of the Related Art

Disk drives are magnetic recording devices used for the storage of information. The information is typically recorded on concentric tracks on either surface of one or more magnetic recording disks. To facilitate the storage and retrieval of data in an orderly manner, disks are typically organized in blocks called sectors. These sectors are located on the disk by a set of unique specifiers called cylinder (or track), head (or side) and sector number. The disks are rotatably mounted to a spin motor and information is accessed by means of read/write heads that are mounted to actuator arms which are rotated by a voice coil motor. The voice coil motor is excited with a current to rotate the actuator and move the heads.

The movement of the actuator is controlled by a servo system, utilizing servo information recorded on one or more of the magnetic recording disks. By reading this servo information, the actual radial positions of the heads can be determined, and after comparison with the desired head radial positions, control signals can be sent to move the actuator accordingly. Servo information is typically stored on a disk in one of two ways. In the first, a dedicated servo system, a set of several tracks on the disk or the entire disk surface, is reserved exclusively for storing information associated with the characteristic of the particular drive. Such information includes servo parameters and read/write channel parameters. A servo head reads this information to provide a continuous signal indicating the position of the servo head with respect to the servo disk. In the second type of servo system, the embedded servo system, sectors of servo information are interspersed with sectors of data on each disk surface. As a read head follows the data track around, it regularly reads a fresh sample of servo information from each servo sector with which to control its position.

FIG. 1 illustrates a typical sector on a disk of a hard disk drive. As shown, a typical sector 10 has a preamble field 20 which includes automatic gain control (AGC) information and synchronization information, a servo address mark 22 which signifies the beginning of a sector, an index field 24 which indicates the beginning of the first sector of the track, an identification field 26 which includes identification bits, a head identification field 28 for identification of head location, a gray code field 30 that identifies the particular cylinder (tracks) of the sector, a servo bit field 32 which includes a number of servo bits A, B, C, D, and a data field 34 which contains the data. The servo bits A, B, C and D are used to maintain the read/write head on the centerline CL of a corresponding track. The identification field 26 typically includes an index bit and 7 bits of angular position information; the head identification field 28 typically includes 3 bits of data for identifying the head (or side) position of the disk pack and the gray code field 30 typically includes 13 bits of data for providing track identification. In conventional disk drives, absolute positional information is stored in graycode in the gray code field 30 of a particular sector 10. Due to power consumption, cost and throughput concerns, reduction of media space used in providing the servo information is highly desirable. However, most of the segments of the sector 10 are head and/or media dependent and reduction of these segments is difficult.

Accordingly, there is a need in the technology for a method and apparatus for providing servo information on a disk in a hard drive assembly while reducing the media space required for the provision of such information.

BRIEF SUMMARY OF THE INVENTION

The present invention is a method and apparatus for providing positional information of a disk. The disk has at least one side with a plurality of tracks, each having a first burst in a first servo field and a second burst in a second servo field. The first burst provides a first portion of track position information while the second burst provides a second portion of track position information. When combined, the first and second portions provide a position of a corresponding track. Each track further includes a third and a fourth burst that provides a first portion and a second portion of disk side position information. When combined, the first and second portions of disk side position information provide the disk side position of the disk. Each track also includes a burst that provides the quadrant position of the disk. In one embodiment, the first and second bursts are located on consecutive sectors, and each track includes a servo sector sequence burst with a sector sequence number that identifies the sequence position of the consecutive sectors. The first portion, the second portion and their corresponding sector sequence number in combination provide a position of a corresponding track.

BRIEF DESCRIPTION OF THE DRAWINGS

FIG. 4A illustrates a plurality of consecutive sectors on one side of the disk pack 100, in accordance with the teachings of the present invention.

FIG. 4B illustrates four bits of head position information as provided by the SDAT fields of sectors 2 and 3 in FIG. 4A respectively.

FIG. 4C illustrates the thirteen bits of track position information, of which bits 8–13 are provided by the SDAT fields of sectors 4–6 of FIG. 4A and of which bits 0–7 are provided by the Graycode field from each sector of FIG. 4A.

DETAILED DESCRIPTION OF THE INVENTION

Figure 1:
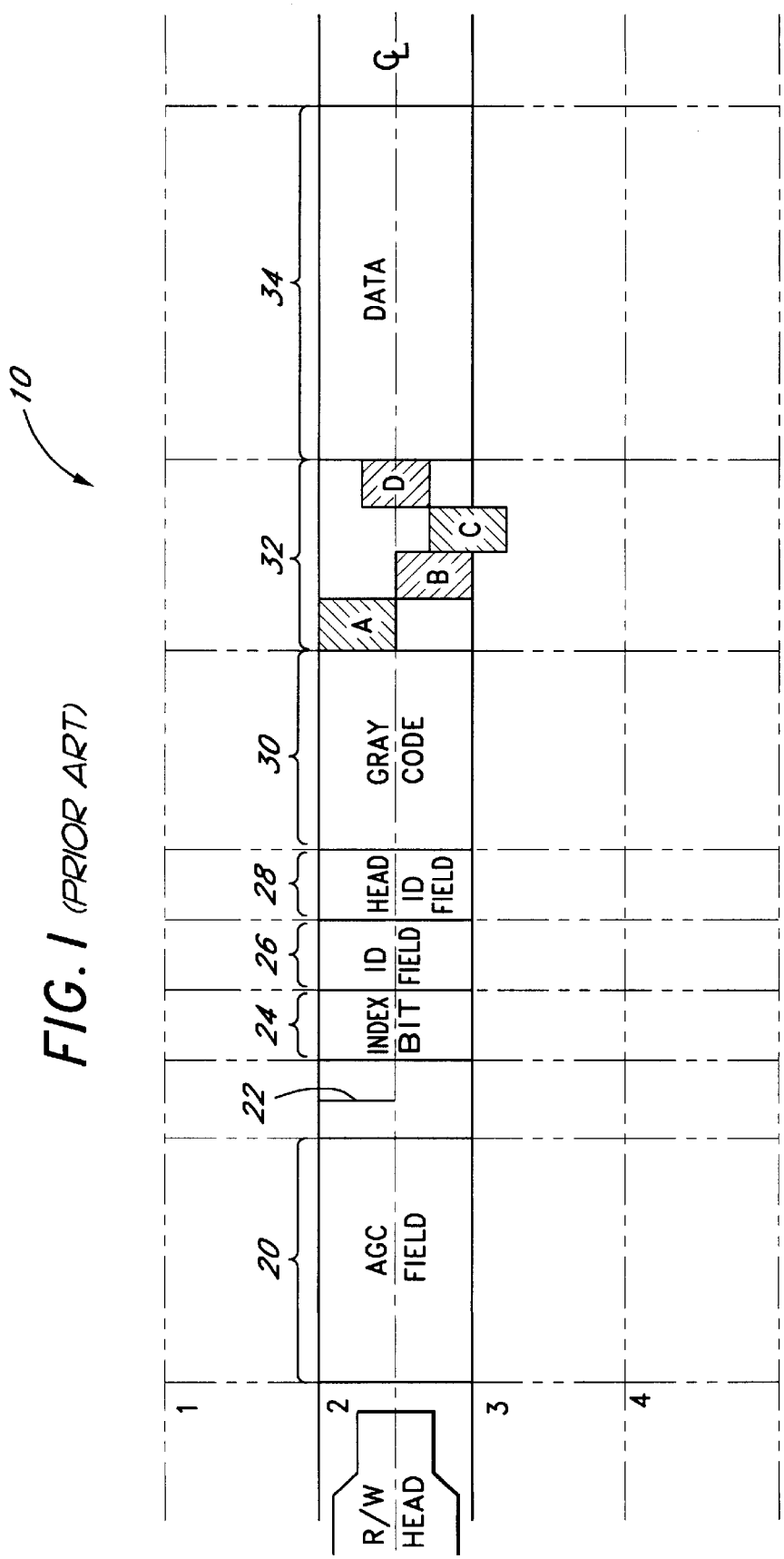
FIG. 1 illustrates a typical data sector of a disk in a disk drive assembly of the prior art.
Figure 2:
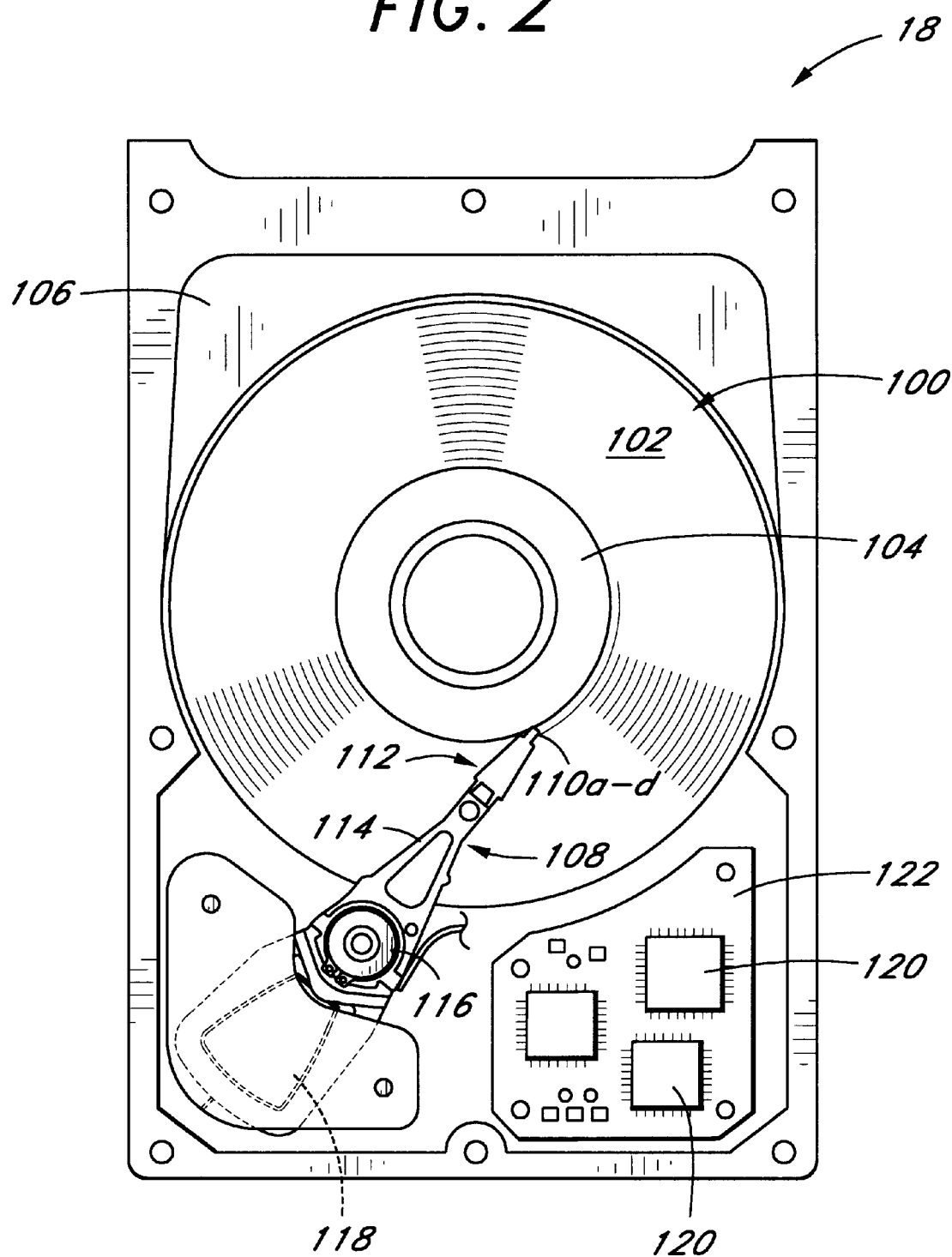
FIG. 2 is a top view of a hard disk drive assembly which utilizes the apparatus and method of the present invention.

Referring to the drawings more particularly by reference numbers, FIG. 2 illustrates a hard disk drive 50 which utilizes the method of the present invention. The disk drive 50 includes a disk pack 100 with a plurality of disks 102 that are collectively rotated by a spin motor 104. The spin motor 104 is mounted to a base plate 106. Also mounted to the base plate 106 is an actuator arm assembly 108. The actuator arm assembly 108 includes a number of read/write (R/W) heads 110a–d mounted to corresponding flexure arms 112. The flexure arms 112 are attached to an actuator arm 114 that can rotate about a bearing assembly 116. The assembly 108 also contains a voice coil motor 118 which moves the heads 110a–d collectively relative to the disks 102. There is typically a single head 110a, 110b, 110c, or 110d for disk head side H0, H1, H2 or H3 (not shown), respectively, of the disk pack 100. The spin motor 104, voice coil motor 118 and the R/W heads 110a–d are coupled to a number of electronic circuits 120 mounted to a printed circuit board 122. The electronic circuits 120 typically include a read channel chip, a microprocessor-based controller and a random access memory (RAM) device.

Figure 3A:
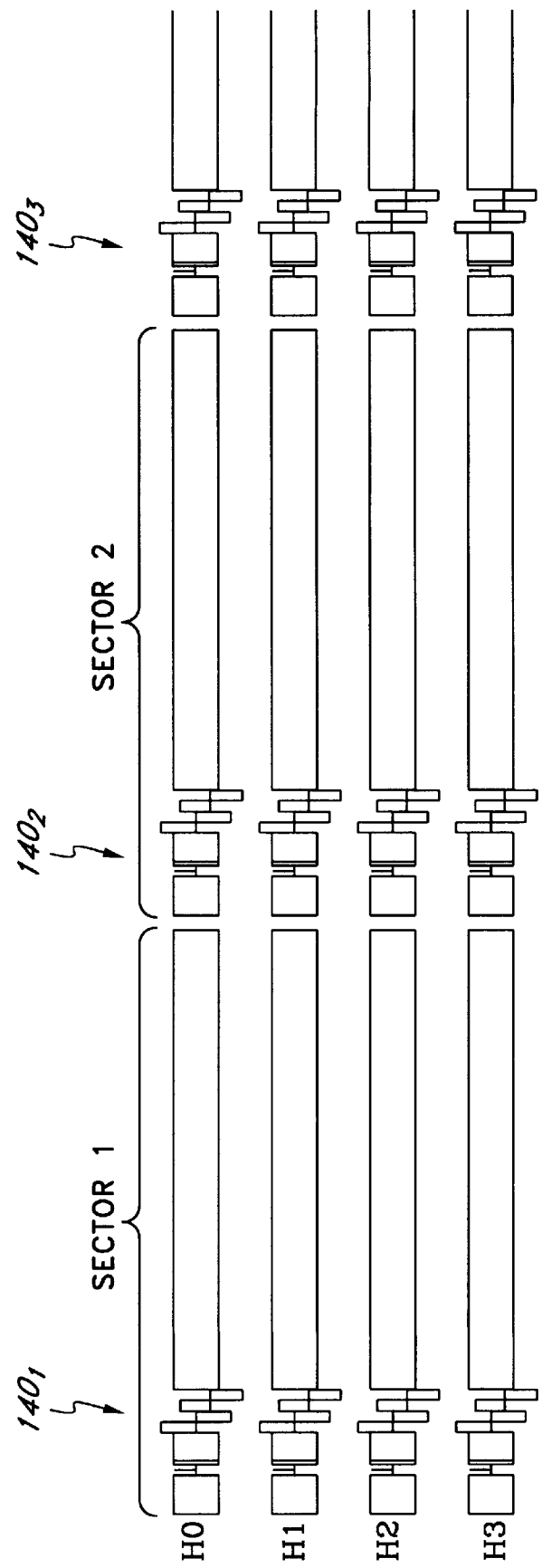
FIG. 3A illustrates exemplary sectors on heads H0–H3 (sides 1–4) of the disk pack 100 of FIG. 2.
Figure 3B:
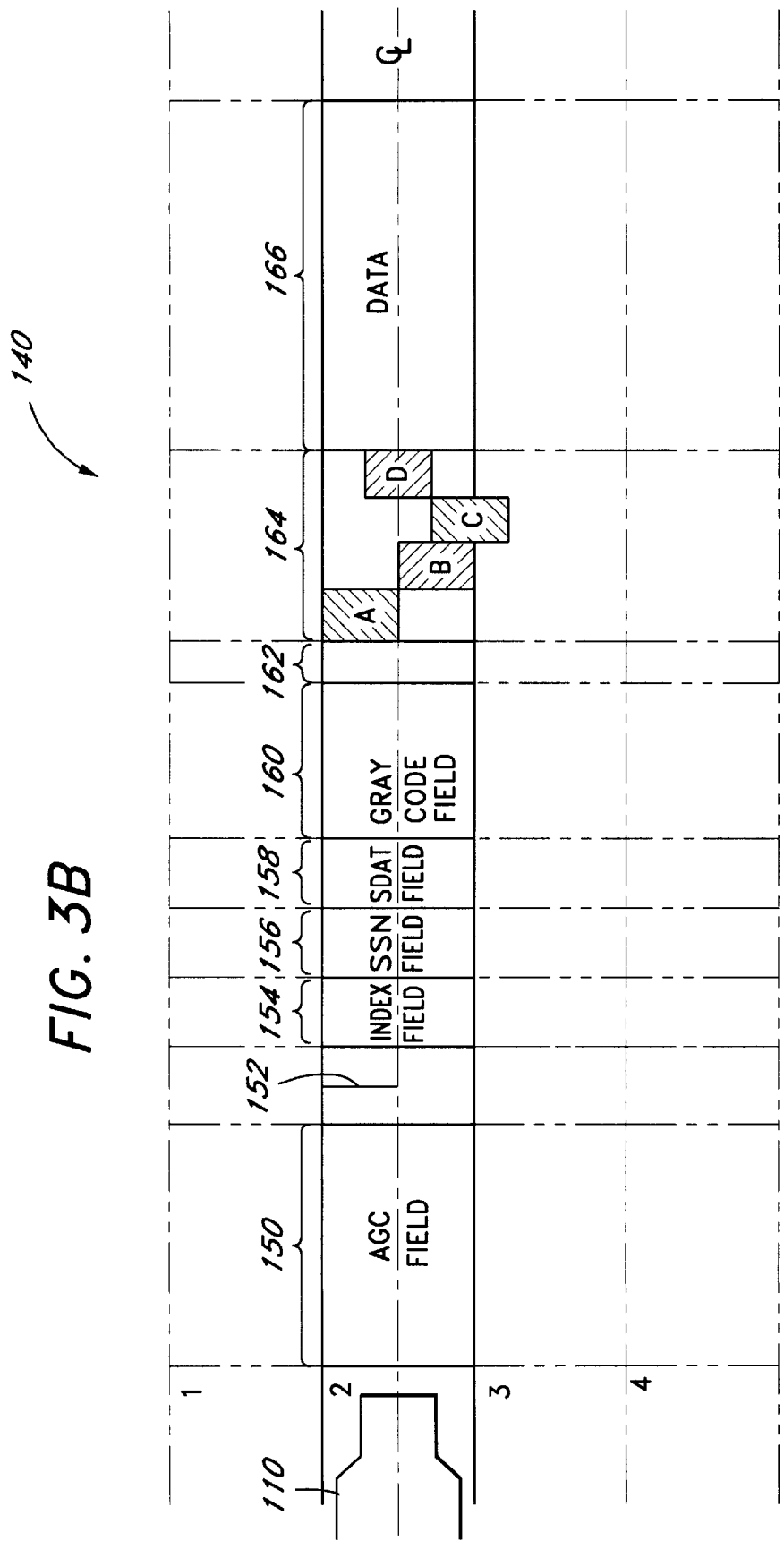
FIG. 3B illustrates an enlarged view of a typical sector of on one side of the disk pack 100 of FIG. 3A as provided in accordance with the teachings of the present invention.

As shown in FIG. 3A, data is typically stored within sectors $140_1$, $140_2$ and $140_3$ of radially concentric tracks located across any one of the disk heads H0–H3 of the disk pack 100. For discussion purposes, any one of the sectors $140_1$, $140_2$ and $140_3$ will be referred to as sector 140. In one embodiment, as shown in FIG. 3B, each sector 140 has a preamble field 150 which includes automatic gain control (AGC) information and synchronization information, an address mark 152 which signifies the beginning of the sector 140, an index field 154 which indicates the beginning of the first sector of the track, a servo sector sequence number (SSN) field 156 that identifies the sector sequence location number of sector 140 as identified among a plurality of consecutive sectors, a servo multiplex data (SDAT) field 158 that provides the higher order bit information related to positional information of the particular cylinder (track) of the sector 140, a gray code field 160 that provides the lower order bit information related to positional information of the particular cylinder (track) of the sector 140, a synchronization field 162, a servo bit field 164 which includes a number of servo bits A, B, C, D, and a data field 166 which contains the data. For present purposes, fields 150–164 will be referred to as the servo field while field 166 will be referred to as the data field. The electronic circuits 120 (see FIG. 2) utilize the servo bits A, B, C and D to maintain the heads 110a–d on the centerline CL of a corresponding track. The heads 110a–d can magnetize and sense the magnetic field of the disk heads H0–H3 to as to provide the information located on the above-described fields 150–166.

In one embodiment, positional information is provided by reading the SSN field 156, the SDAT field 158 and the graycode field 160 of six consecutive bursts of servo data. Table 1 illustrates an example of positional information that is provided in the SSN field 156, the SDAT field 158 and the graycode field 160, and the interrelationship between the fields. Together, the information located in the SSN field 156, the SDAT field 158 and the graycode field 160 provide a matrix of positional information for identifying the quadrant, the head and track position of the disk pack 100.

As shown in Table 1, there are 72 servo sectors on an exemplary head, head 4 (H3) of the disk pack 100, each labeled from 0–71. The 72 servo sectors are divided into groups each having six consecutive sectors. Each of the six consecutive sectors can be identified by an SSN of 0–7, since a minimum of 3 bits are required, as provided in the SSN field 156 of each sector 140 (see FIG. 3B). As discussed earlier, the (SDAT) field 158 provides the higher order bit information related to positional information of the particular cylinder (track) of the sector 140, while the gray code field 160 provides the lower order bit information related to positional information of the particular cylinder (track) of the sector 140.

In one embodiment, index information is provided in field $156_0$ of sector 0 as 7 (binary 111). In one alternate embodiment, index information is provided in both sectors 0 and 1. In this case, the index information is provided in SSN field $156_0$ as 7 (binary 111) and in SSN field $156_1$, as 6 (binary 110).

TABLE 1

Example of data in servo pattern at Cylinder 24CDH, Heads 4.
Binary CDH = Graycode CDH
Binary 24H = Graycode 26H

| Servo Sector | SSN | SDAT <1:0> | OFFSET <7:0> | COMMENTS |
|---|---|---|---|---|
| 0 | 7 | 1,1 | CDH | Index position, SSN = 7 SDAT = 00 for 1st 1/4 rev. |
| 1 | 1 | 1,0 | CDH | SDAT = Hd <3:02> |
| 2 | 2 | 0,1 | CDH | SDAT = Hd <1:0> |
| 3 | 3 | 1,0 | CDH | SDAT = Cyl <13:12> |
| 4 | 4 | 0,1 | CDH | SDAT = Cyl <11:10> |
| 5 | 5 | 1,0 | CDH | SDAT = Cyl <9:8> |
| 6 | 0 | 0,0 | CDH | SSN = 0 so SDAT = 0 |
| 7 | 1 | 1,0 | CDH | SDAT = Hd <3:2> |
| 8 | 2 | 0,1 | CDH | SDAT = Hd <1:0> |
| 9 | 3 | 1,0 | CDH | SDAT = Cyl <13:12> |
| 10 | 4 | 0,1 | CDH | SDAT = Cyl <11:10> |
| 11 | 5 | 1,0 | CDH | SDAT = Cyl <9:8> |
| 12 | 0 | 0,0 | CDH | |
| 13 | 1 | 1,0 | CDH | |
| ... | ... | ... | ... | |
| 18 | 0 | 0,1 | CDH | SDAT = 01 for 2nd 1/4 rev. |
| ... | ... | ... | ... | |
| 36 | 0 | 1,0 | CDH | SDAT = 10 for 3rd 1/4 rev. |
| ... | ... | ... | ... | |
| 54 | 0 | 1,1 | CDH | SDAT = 11 for 4th 1/4 rev. |
| ... | ... | ... | ... | |
| 68 | 2 | 0,1 | CDH | |
| 69 | 3 | 0,0 | CDH | |
| 70 | 4 | 0,1 | CDH | |
| 71 | 5 | 0,1 | CDH | |

In the present example, the combination of SSN=0 and an SDAT number identifies the quadrant position on a disk in the disk pack 100. For example, the combination of SSN=0 and SDAT=00 identifies a particular position as the first quadrant of a disk; while the combination of SSN=0 and SDAT=01 identifies a particular position as the second quadrant of the disk. Similarly, the combination of SSN=0 and SDAT=10 identifies a particular position as the third quadrant of the disk; while the combination of SSN=0 and SDAT=11 identifies a particular position as the fourth quadrant of the disk. However, where SSN=7 and SDAT=00, it indicates that a particular position is the first sector in the first quadrant of the disk.

In addition, the combination of SSN=1 or SSN=2 with an SDAT number identifies a particular position as the head (or side position) of the disk pack 100. With reference to Table 1, the combination of SSN=1 and SDAT=10 identifies a particular position as head 4 or H3 of the disk pack 100, while the combination of SSN=1 and SDAT=01 identifies a particular position as head 3 or H2 of the disk pack 100. Similarly, the combination of SSN=2 and SDAT=01 identifies a particular position as head 2 or H1 of the disk pack, while the combination of SSN=2 and SDAT=10 identifies a particular position as head 1 or H0 of the disk pack 100.

Finally, the combination of SSN=3, 4 or 5 and an SDAT number provides the higher order bit information related to positional information of the particular cylinder (track) of a disk in the disk pack 100. For example, the combination of SSN=3 and SDAT=10 or 01 provides the position information of bits 13 and 12, where the bit positions are identified from 0–13 (the 14th and 13th bits among 14 bits) of graycode information required to completely identify the cylinder or track on a disk. Similarly, the combination of SSN=4 and SDAT=01 or 10 provides position information of bits 11 and 10 (the 12th and 11th bits among 14 bits) of the graycode information required to completely identify the cylinder, while the combination of SSN=5 and SDAT=10 or 01 provides positional information for bits 9 and 8 (the 10th and 9th bits among 14 bits) of graycode information required to completely identify the cylinder. The remaining 8 bits of graycode information is located in the graycode field 160 located in each sector 140.

FIG. 4A illustrates an example of how the present invention may be implemented utilizing six consecutive sectors on a typical track. The six sectors, SECTORS 0–5, each has an SSN field $156_0$–$156_5$, an SDAT field $158_0$–$158_5$ and a graycode field $160_0$–$160_5$. Each SSN field $156_0$–$156_5$ provides 3 bits of information related to the sector sequence position of each sector SECTORS 0–5 among the 6 sectors, while each SDAT field $158_0$–$158_5$ provides 2 bits of information which provides any of the following information when used in combination with the SSN number: (1) identifies the quadrant position of a disk in the disk pack 100; (2) identifies the head (or side) of the disk pack 100 or (3) provides 2 of six upper bits of information related to the track position information; and each graycode field $160_0$–$160_5$ provides the 8 lower bits of information related to track position information.

As discussed earlier, the combination of SSN=0 and an SDAT number identifies the quadrant position on a disk in the disk pack 100. In addition, the combination of SSN=1 or SSN=2 with an SDAT number identifies a particular position as the head (or side position) of the disk pack 100. Finally, the combination of SSN=3, 4 or 5 and an SDAT number provides the higher order bit information related to positional information of the particular cylinder (track) of a disk in the disk pack 100.

FIG. 4B illustrates the 4 bits of information that may be obtained from two of the six sectors, SECTORS 1 and 2, which together identifies head (or side) position of a disk pack 100. As shown, when the SSN field 156 preceding an SDAT field 158 indicates that the SSN is 1 (binary 001), the following SDAT field 158 will provide the upper 2 bits of head positional information. When the SSN field 156 preceding an SDAT field 158 indicates that the SSN is 2 (binary 010), the following SDAT field 158 will provide the lower 2 bits of head positional information. After reading the SSN fields $156^1$ and $156_2$ of the sectors SECTORS 1 and 2, one will obtain the head position information of a particular location of the disk pack 100.

FIG. 4C illustrates the 14 bits of information that may be obtained from three of six sectors, SECTORS 3–5, which together identifies the track (or cylinder) position of a disk pack 100. As shown, each graycode field $160_0$–$160_5$ provides the 8 lower bits of information related to track position information. When one of the R/W heads 100 *a–d* is reading from a track within a particular band of tracks, where there are 256 tracks in one band, the information from the 8 lower bits is sufficient to identify the position of the head. However, when any of the R/W heads 100*a–d* is moving from one band to another, additional information is required to identify its location. As shown, when the SSN field 156 preceding an SDAT field 158 indicates that the SSN is 3 (binary 011), the following SDAT field will provide the two uppermost bits (bits 13 and 12) of the 14 bits of data required to provide track position. When the SSN field 158 indicates that the SSN is 4 (binary 100), the following SDAT field 158 will provide the following two uppermost bits (bits 11 and 10) of the 14 bits of data required to provide track information. Finally, when the SSN field 156 indicates that the SSN is 5 (binary 101), the following SDAT field 158 will provide the last of the uppermost bits (bits 9 and 8) of the 14 bits of data required to provide track position. Thus, by scanning the SSN field 156, the SDAT field 158 and the graycode field 160 of at least 6 consecutive sectors as provided by the present invention, complete positional information of a particular location on the disk pack 100 may be obtained.

Through the implementation of the technique of the present invention, servo information on a disk in a hard drive assembly may be provided while reducing the media space required for the provision of such information. As a result, more media space may be utilized for the storage of data.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed:

1. A disk for a hard disk drive, comprising:
   a disk including at least one side having a plurality of tracks, each track including a group having first and second sectors, each of the first and second sectors within said group includes first and second servo fields, the first servo field in each of the first and second sectors providing a portion of higher order bits of a track position information, the second servo field in each of the first and second sectors providing lower order bits of the track position information, the first servo fields of the first and second sectors and the second servo field in one of the first and second sectors, in combination, providing the track position information.

2. The disk as recited in claim 1, wherein the group includes a third sector having first and second servo fields, the first servo field in the third sector providing a portion of higher order bits of the track position information, and the second servo field in the third sector providing lower order bits of the track position information, the first servo fields of the first, second, and third sectors and the second servo field in one of the first, second, and third sectors, in combination, providing the track position information.

3. The disk as recited in claim 2, wherein the group includes a fourth sector having a first servo field, the first servo field in the fourth sector of the group providing a disk side position of the disk.

4. The disk as recited in claim 3, wherein the group includes a fifth sector having a first servo field, the first servo field in the fourth and fifth sectors, in combination, providing the disk side position of the disk.

5. The disk as recited in claim 4, wherein the group includes a sixth sector having a first servo field, the first servo field in the sixth sector providing a quadrant of the disk.

6. The disk as recited in claim 5, wherein each track includes a plurality of groups each having six sectors, wherein complete disk positional information is obtained by reading one of the plurality of groups of six sectors.

7. The disk as recited in claim 1, wherein the first servo field of the first and second sectors each includes a sector sequence number field and a servo multiplex data field, a sequence number in the sector sequence number field identifies a value in the corresponding servo multiplex data field as the portion of the track position information.

8. The disk as recited in claim 5, wherein the first servo field in each of the first through six sectors of the group includes a sector sequence number field and a servo multiplex data field, a sequence number in the sector sequence number field identifies a value in the corresponding servo multipex data field.

9. The disk as recited in claim 8 wherein when the sequence number is at a first number, the value in the corresponding servo multiplex data field represents the portion of the higher order bits of the track position information, where when the sequence number is at a second number, the value in the corresponding servo multiplex data field represents a portion of the disk side position of the disk, and wherein when the sequence number is at a third number, the value in the corresponding servo multiplex data field represents the quadrant of the disk.

10. A hard disk drive, comprising:

a housing;

a spin motor mounted to said housing;

an actuator arm mounted to said spin motor;

a disk attached to said spin motor, said disk having at least one side with a plurality of tracks, each track including a group having first and second sectors, each of the first and second sectors within said group includes first and second servo fields, the first servo field in each of the first and second sectors providing a portion of higher order bits of a track position information, the second servo field in each of the first and second sectors providing lower order bits of the track position information, the first servo fields of the first and second sectors and the second servo field in one of the first and second sectors, in combination, providing the track position information; and a read/write head mounted to said actuator arm for reading said at least one side of said disk.

11. The hard disk drive as recited in claim 10, wherein the group includes a third sector having first and second servo fields, the first servo field in the third sector providing a portion of higher order bits of the track position information, and the second servo field in the third sector providing lower order bits of the track position information, the first servo fields of the first, second, and third sectors and the second servo field in one of the first, second, and third sectors, in combination, providing the track position information.

12. The hard disk drive as recited in claim 11, wherein the group includes a fourth sector having a first servo field, the first servo field in the fourth sector of the group providing a disk side position of the disk.

13. The hard disk drive as recited in claim 12, wherein the group includes a fifth sector having a first servo field, the first servo field in the fourth and fifth sectors, in combination, providing the disk side position of the disk.

14. The hard disk drive as recited in claim 13, wherein the group includes a sixth sector having a first servo field, the first servo field in the sixth sector providing a quadrant of the disk.

15. The hard disk drive as recited in claim 14, wherein the first servo field in each of the first through six sectors of the group includes a sector sequence number field and a servo multiplex data field, a sequence number in the sector sequence number field identifies a value in the corresponding servo multiplex data field.

16. The hard disk drive as recited in claim 15 wherein when the sequence number is at a first number, the value in the corresponding servo multiplex data field represents the portion of the higher order bits of the track position information, where when the sequence number is at a second number, the value in the corresponding servo multiplex data field represents a portion of the disk side position of the disk, and wherein when the sequence number is at a third number, the value in the corresponding servo multiplex data field represents the quadrant of the disk.

17. A method for providing servo information on a disk in a hard disk drive, comprising:

a) providing a disk having at least one side with a plurality of tracks, each track including a group having first and second sectors, each of the first and second sectors within said group includes first and second servo fields, the first servo field in each of the first and second sectors providing a portion of higher order bits of a track position information, the second servo field in each of the first and second sectors providing lower order bits of the track position information;

b) reading the first servo fields of the first and second sectors and the second servo field in one of the first and second sectors; and c) determining track position information of the disk in response to reading the first servo fields of the first and second sectors and the second servo field in one of the first and second sectors.

18. The method as recited in claim 17, wherein the group includes a third sector having a first servo field providing a disk side position of the disk, and wherein reading comprises reading the first servo fields of the first through third sectors and the second servo field in one of the first and second sectors, and wherein determining comprises determining track position information and disk side position of the disk.

19. The method as recited in claim 18 wherein the group includes a fourth sector having a first servo field providing a quadrant of the disk, and wherein reading comprises reading the first servo fields of the first through fourth sectors and the second servo field in one of the first and second sectors, and wherein determining comprises determining track position information, disk side position, and quadrant of the disk.

20. The method as recited in claim 17, wherein each track includes a plurality of groups.

* * * * *